United States Patent
Rosengard et al.

(10) Patent No.: US 7,376,141 B2
(45) Date of Patent: *May 20, 2008

(54) METHOD AND SYSTEM FOR ENCAPSULATING VARIABLE-SIZE PACKETS

(75) Inventors: Phillip I. Rosengard, Sterling, VA (US); Marwan M. Krunz, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 1138 days.

This patent is subject to a terminal disclaimer.

(21) Appl. No.: 10/322,120

(22) Filed: Dec. 17, 2002

(65) Prior Publication Data

US 2004/0117502 A1 Jun. 17, 2004

(51) Int. Cl.
*H04L 12/28* (2006.01)

(52) U.S. Cl. .............. 370/412; 370/471; 370/473; 370/474; 709/236

(58) Field of Classification Search ........... 370/412, 370/413–420, 468, 471
See application file for complete search history.

(56) References Cited

U.S. PATENT DOCUMENTS

| | | | |
|---|---|---|---|
| 5,537,408 A | 7/1996 | Branstad et al. | 370/79 |
| 5,557,608 A * | 9/1996 | Calvignac et al. | 370/389 |
| 6,252,855 B1 | 6/2001 | Langley | 370/252 |
| 6,483,846 B1 | 11/2002 | Huang et al. | 370/445 |
| 6,570,849 B1 | 5/2003 | Skemer et al. | 370/230.1 |
| 6,701,363 B1 * | 3/2004 | Chiu et al. | 709/224 |
| 6,990,105 B1 * | 1/2006 | Brueckheimer et al. | 370/395.5 |
| 7,013,318 B2 * | 3/2006 | Rosengard et al. | 715/504 |
| 7,170,897 B2 * | 1/2007 | Mackiewich et al. | 370/401 |

FOREIGN PATENT DOCUMENTS

| | | |
|---|---|---|
| EP | 1 178 635 A1 | 2/2002 |
| EP | 1 303 083 A1 | 4/2003 |
| EP | 1 317 110 A1 | 6/2003 |
| WO | WO 98/47293 | 10/1998 |
| WO | 03/103241 A1 | 12/2003 |
| WO | 2004/062203 A1 | 7/2004 |

OTHER PUBLICATIONS

Final Draft ETSI EN 301 192 V1.3.1 (Jan. 2003), European Standard (Telecommunications series), Digital Video Broadcasting (DVB); DVB specification for data broadcasting. © European Telecommunications Standards Institute 2003; © European Broadcasting Union 2003. All rights reserved. 58 pages.

(Continued)

*Primary Examiner*—Chi Pham
*Assistant Examiner*—Shick Hom
(74) *Attorney, Agent, or Firm*—Baker Botts L.L.P.

(57) ABSTRACT

Encapsulating packets includes receiving packets at a queue of an encapsulator. The following operations are repeated until certain criteria are satisfied. A number of packets are accumulated at the queue. A current encapsulation efficiency associated with the accumulated packets is determined. A next encapsulation efficiency associated with the accumulated packets and a predicted next packet is determined. If the current encapsulation efficiency satisfies an encapsulation efficiency threshold and if the current encapsulation efficiency is greater than the next encapsulation efficiency, the accumulated packets are encapsulated. Otherwise, the packets continue to be accumulated at the queue.

31 Claims, 3 Drawing Sheets

OTHER PUBLICATIONS

PCT, Notification of Transmittal of The International Search Report or the Declaration, International Application No. PCT/US03/30957, 7 pages, Apr. 16, 2004.

J. K. Roussos, et al., "*Congestion control protocols for interconnected LANs supporting voice and data traffic*," Computer Communications, XP 000415044, vol. 17, No. 1, © 1994 Butterworth-Heinemann Ltd., pp. 25-34, Jan. 1994.

PCT, Notification of Transmittal of the International Search Report and the Written Opinion of the International Searching Authority, or the Declaration dated Dec. 22, 2004 for International Application No. PCT/US2004/026942, 12 pages.

* cited by examiner

METHOD AND SYSTEM FOR ENCAPSULATING VARIABLE-SIZE PACKETS

TECHNICAL FIELD OF THE INVENTION

This invention relates generally to the field of data communication and more specifically to a method and system for encapsulating variable-size packets.

BACKGROUND OF THE INVENTION

Encapsulating packets in a communication system may involve the use of multiple queues for buffering packets waiting to be encapsulated. Packets at different queues, however, may experience different waiting times prior to encapsulation, also known as packet delay variation. Packet delay variation may introduce unwanted jitter into the communication system. Moreover, encapsulation according to known techniques may result in sub-optimal bandwidth usage of a communications channel. Furthermore, packets associated with Internet Protocol (IP) traffic may involve datagrams of variable size, which may affect encapsulation for optimal bandwidth usage. Consequently, encapsulating packets while controlling jitter and enhancing bandwidth utilization has posed challenges.

SUMMARY OF THE INVENTION

In accordance with the present invention, disadvantages and problems associated with previous techniques for encapsulation of variable-size packets in data communication may be reduced or eliminated.

According to one embodiment, encapsulating packets includes receiving packets at a queue of an encapsulator. The following operations are repeated until certain criteria are satisfied. A number of packets are accumulated at the queue. A current encapsulation efficiency associated with the accumulated packets is determined. A next encapsulation efficiency associated with the accumulated packets and a predicted size and arrival time of the next packet is determined. If the current encapsulation efficiency satisfies an encapsulation efficiency threshold and if the current encapsulation efficiency is greater than the next encapsulation efficiency, the accumulated packets are encapsulated.

Certain embodiments of the invention may provide one or more technical advantages. A technical advantage of one embodiment may be that the size of an encapsulation section is adjusted in response to a current encapsulation efficiency and a predicted jitter in an effort to control jitter while maintaining efficiency. If the accumulated packets satisfy an encapsulation efficiency threshold, the packets may be encapsulated to maintain efficiency while controlling delay jitter. Another technical advantage of an embodiment may be that a delay associated with receiving predicted packets may be determined and if the delay satisfies a jitter requirement, the accumulated packets may be encapsulated to control jitter. Yet another technical advantage of an embodiment may be that encapsulation sections packets may be formed into cells to improve jitter. The encapsulation sections may be formed into cells so that wasted, or additional, capacity in the cells is avoided.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
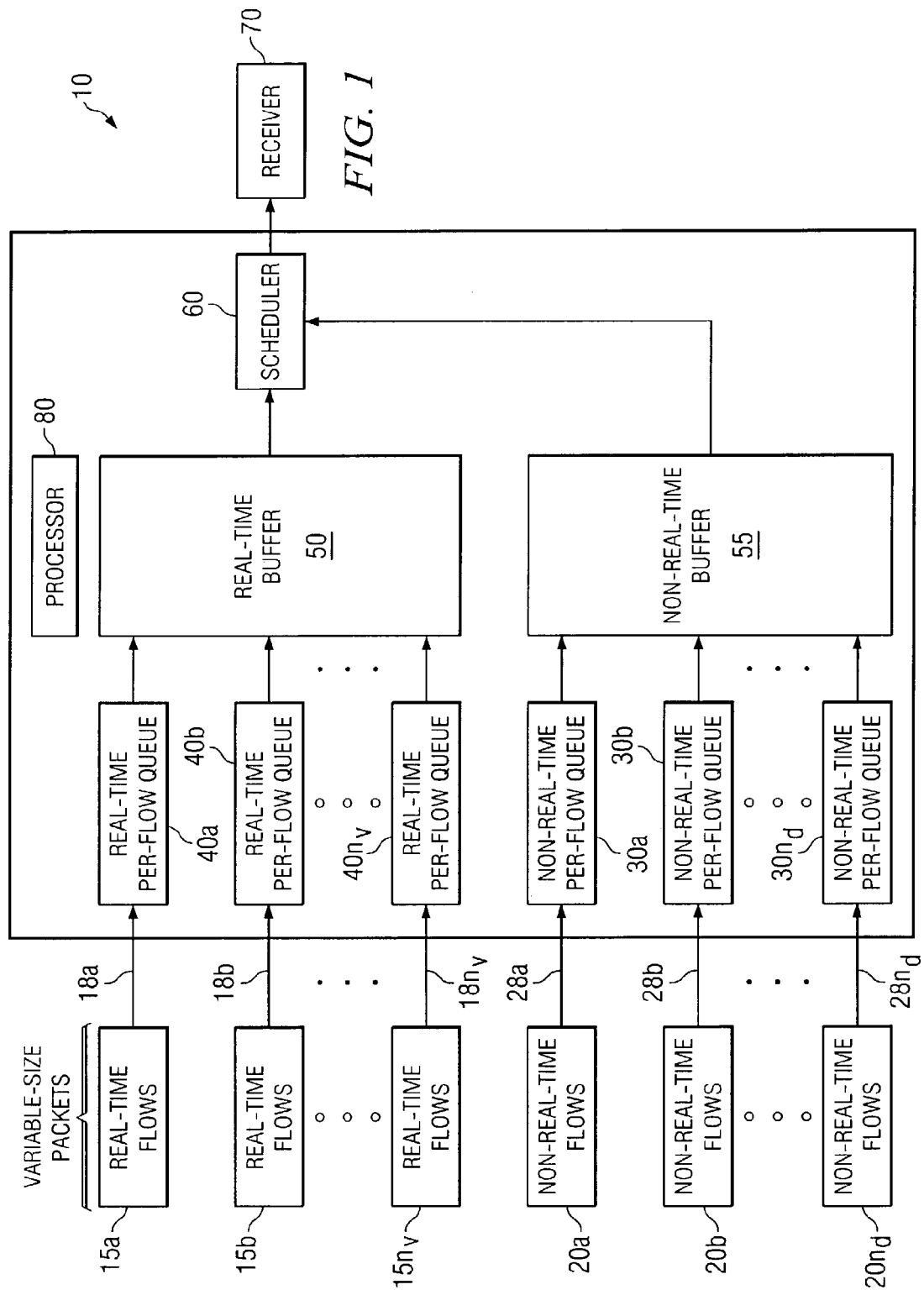
FIG. 1 illustrates an embodiment of a system for encapsulating packets to form encapsulation sections.

FIG. 1 illustrates a system 10 for encapsulating packets to form encapsulation sections. System 10 adjusts the size of the sections in order to achieve a high encapsulation efficiency while ensuring satisfaction of a jitter requirement. In general, encapsulating a large section increases jitter. However, encapsulating a small section, while reducing jitter, results in lower efficiency. System 10 predicts jitter and efficiency, and adjusts the size of the encapsulation sections to reduce jitter while maintaining efficiency.

System 10 receives packets from real-time flows 15 and non-real-time flows 20, encapsulates the received packets to form encapsulation sections, forms the encapsulation sections into cells, and transmits the cells to a receiver 70. Packets may be associated with datagrams of different sizes or variable-size packets. For example, a packet may comprise an IP packet or datagram, which may be of any suitable size. Cells may generally be associated with fixed-size packet of data. For example, a cell may comprise a moving pictures experts group-2 packet (MPEG-2 packet). Any other suitable packet of fixed or variable size may be formed into cells without deviating from the concept of this invention.

Real-time flows 15 transmit real-time traffic, and non-real-time flows 20 transmit non-real-time traffic. According to one embodiment, real-time flows 15 may comprise any delay-sensitive traffic, for example, voice data such as voice over IP (VOIP) or video on demand (VOD) data. Non-real-time flows 20 may include any delay-tolerant traffic, for example, IP data. Flows that transmit other types of delay-sensitive traffic such as voice traffic or other real-time traffic may be used in place of or in addition to real-time flows 15.

System 10 may receive any suitable type of traffic, for example, moving pictures experts group-2 (MPEG-2) or MPEG-4 video traffic, voice over Internet protocol (VOIP), or Internet protocol (IP) packet traffic. The traffic may be classified according to jitter tolerance. According to one embodiment, traffic that is jitter tolerant comprises non-real-time traffic, and traffic that is not jitter tolerant comprises real-time traffic. Jitter tolerant traffic, however, may comprise any traffic that is jitter tolerant according to any suitable definition of "jitter tolerant," and jitter intolerant traffic may comprise any traffic that is not jitter tolerant. For example, jitter intolerant traffic may include voice traffic.

System 10 includes real-time per-flow queues 40, non-real-time per-flow queues 30, and a processor 80. Real-time per-flow queues 40 buffer real-time traffic from real-time flows 15, and non-real-time per-flow queues 30 buffer non-real-time traffic from non-real-time flows 20. Each real-time per-flow queue 40a may receive from real-time flows 15 a real-time flow 15a corresponding to the real-time per-flow queue 40a. Similarly, each non-real-time per-flow queue 30a receives a non-real-time flow 20a associated with the non-real-time per-flow queue 30a. As used in this document, "each" refers to each member of a set or each member of a subset of the set. Any number $n_v$ of real-time flows 15 may be used and any suitable number $n_d$ of non-real-time flows 20 may be used. Similarly, any suitable number of real-time per-flow queues $40n_v$ and non-real-time per-flow queues $30n_d$ may be used. According to one embodiment, queues that queue other types of traffic such as voice traffic or other real-time traffic may be used in place of or in addition to real-time per-flow queues 40 or non-real-time per-flow queues 30.

Processor 80 manages the encapsulation process that starts when an incoming packet is received at a real-time per-flow queue 40. Processor 80 determines if the packets accumulated at the real-time per-flow queue 40 form an encapsulation section of a maximum section size. If the packets do not form an encapsulation section of a maximum section size, processor 80 determines if a current encapsulation efficiency of the accumulated packets satisfies an encapsulation efficiency threshold. Processor 80 may predict a next packet size to determine if the current encapsulation efficiency would improve by waiting for the next packet. Processor 80 may also predict a next packet arrival time to determine whether a jitter requirement would be violated by waiting for the next packet. The processor 80 may adjust the size of sections to be encapsulated at the corresponding real-time per-flow queues 40, and may also adjust the number of cells formed from the encapsulated sections. In addition, processor 80 may adjust the number of packets received from non-real-time per-flow queues 30 that are encapsulated to form sections and cells.

Encapsulation sections from queues 40 and 30 are formed into cells. Cells of real-time encapsulation sections are copied into common real-time buffer 50, and cells of non-real-time encapsulation sections are copied into common non-real time buffer 55. The cells of an encapsulation section may be copied sequentially into real-time buffer 50 or non-real time buffer 55 such that the cells are not interleaved by cells of another encapsulation section. Real-time buffer 50 and non-real time buffer 55 may process the cells according to a first-in-first-out procedure. According to one embodiment, buffers that buffer other types of traffic such as voice traffic or other real-time traffic may be used in place of or in addition to real-time buffer 50 or non-real time buffer 55.

System 10 may also include a scheduler 60 that outputs real-time cells from real-time buffer 50 and non-real-time cells from non-real time buffer 55. Cells received at the real-time buffer 50 and non-real time buffer 55 may be handled by the scheduler 60 in order of priority. For example, real-time cells associated with the real-time buffer 50 may be assigned higher priority than non-real-time cells associated with the non-real time buffer 55 such that non-real-time cells from non-real time buffer 55 are transmitted only if real-time buffer 50 is empty. Accordingly, non-real time buffer 55 may be sufficiently large to store delayed non-real-time encapsulation sections. The scheduler 60 may further transmit the cells from the real-time buffer 50 and non-real time buffer 55 to a receiver 70. Any other suitable priority-scheduling schemes may be used to arbitrate between the real-time buffers and the non-real-time buffers.

To summarize, system 10 encapsulates packets to form encapsulation sections. The number of packets to be encapsulated at each real-time per-flow queue 40 is adjusted in response to an encapsulation efficiency threshold and a jitter requirement, with the goal of reducing jitter while maintaining efficiency. Encapsulation sections are formed into cells. One embodiment of the formation of cells from encapsulation sections is to be described with reference to FIG. 2. A cell flow may be transmitted to receiver 70. One embodiment of a cell flow is described with reference to FIG. 3. A method for determining when to encapsulate packets is described with reference to FIG. 4. Another embodiment of the formation of cells from encapsulation sections is described with reference to FIG. 5. Another embodiment of a cell flow is described with reference to FIG. 6.

Figure 2:
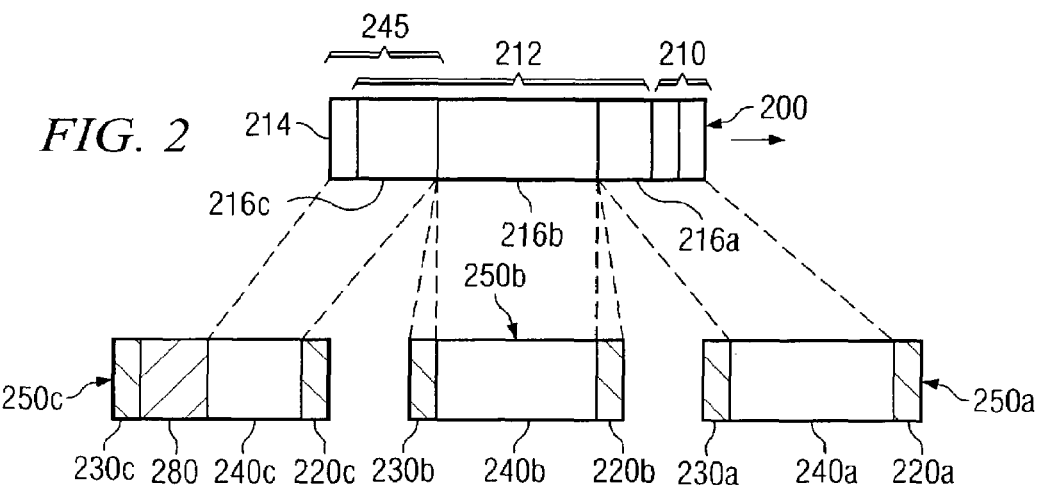
FIG. 2 illustrates an embodiment of the formation of cells from encapsulation sections.

FIG. 2 illustrates an embodiment of the formation of cells 250 from encapsulation section 200. According to one embodiment, encapsulation section 200 may comprise a Multi-Protocol Encapsulation (MPE) section. Encapsulation section 200 includes a section header 210, section data 212, and a section footer 214. Section header 210 may include, for example, digital video broadcasting (DVB) Multi-Protocol Encapsulation (MPE) header data. Section header 210 may also include, for example, Digital Storage Media Command and Control (DSM-CC) header data. Section data 212 includes packets 216. According to one embodiment, each packet 216 may comprise an IP packet or datagram. Section footer 214 may include, for example, error correction codes. According to one embodiment, datagram sizes are variable, while section header 210 has, for example, 20 bytes, and section footer 214 has, for example, 4 bytes.

According to one embodiment, encapsulation section 200 may be formed into cells 250. Each cell 250 includes a cell header 220, a payload 240, and a cell footer 230. Cell header 220 may include, for example, MPEG-2 packet header data. Cell footer 230 may include, for example, MPEG-2 packet footer data. Payload 240 may include MPEG-2 packets which have, according to one embodiment, 184 bytes.

According to one embodiment, an encapsulation section 200 may be formed into one or more sequential cells 250. In the illustrated example, a cell 250a may be loaded with a first portion of section 200, a next cell 250b may be loaded with a continuing portion of section 200, and a cell 250c may be loaded with a last portion of section 200. In general, cells 250 may be formed sequentially until the encapsulation section 200 has been fragmented into one or more cells 250. According to one embodiment, a cell 250 loaded with a last portion of an encapsulation section 200 may include additional capacity 280. In the illustrated example, a last portion 245 of encapsulation section 200, comprising a section data 216c and section footers 214, is loaded into the payload of cell 250c to form a loaded portion of the payload 240c. The last portion 245 does not fill the capacity of the payload, so cell 250c has additional capacity 280. However, cells 250 may be formed in any other suitable manner. For example, another embodiment of forming cells 250 is described with reference to FIGS. 5 and 6.

Figure 3:
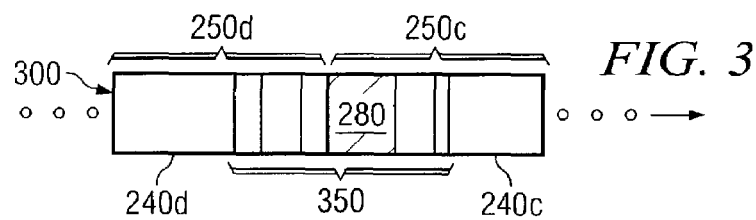
FIG. 3 illustrates an embodiment of a cell flow.

FIG. 3 illustrates an embodiment of a cell flow 300 resulting from the formation of cells 250 as described with reference to FIG. 2. In general, the cell flow 300 may include cells 250 ordered sequentially, consecutively, successively, serially, or in any similar manner therewith. According to one embodiment, each cell 250 may include, for example, IP cells or datagrams 240. In the illustrated example, a last portion of cell 250c associated with datagram 240c may be followed by a first portion of a cell 250d associated with datagram 240d. According to one embodiment, a cell 250c may include additional capacity 280. Additional capacity 280 may result from the formation of cells as illustrated in FIG. 2. In the illustrated example, a cell flow 300 containing additional capacity 280 may contribute to a delay 350. Delay 350 or jitter experienced in a cell flow 300 may be calculated as the time lapsed between a last IP datagram 240c and next IP datagram 240d. Cell flow 300 may be formed in any other suitable manner, for example, with the exclusion of additional capacity 280 as described with reference to FIGS. 5 and 6.

Figure 4:
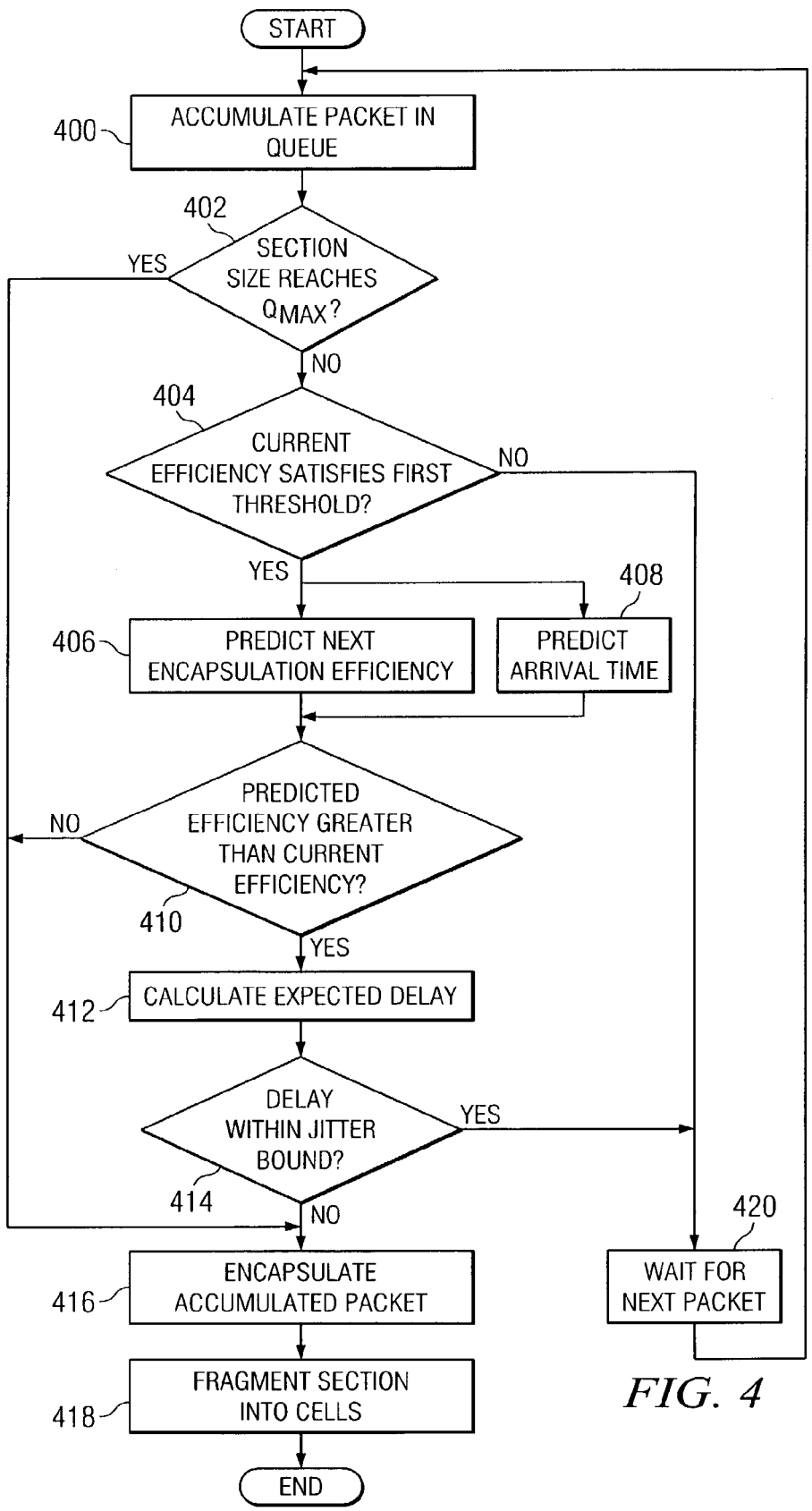
FIG. 4 is a flowchart illustrating a method for encapsulating packets.

FIG. 4 is a flowchart illustrating an embodiment of a method for encapsulating IP packets. The following parameters may be used to perform calculations described in the examples illustrated with reference to FIG. 4.

| Parameter | Definition |
|---|---|
| n | Total number of real-time and non-real-time flows. |
| $n_v$ | Number of real-time flows |
| $n_d$ | Number of non-real-time flows |
| $\eta(\chi)$ | Encapsulation efficiency for a section with an $\chi$-byte payload |
| $\eta_{opt}$ | Optimal encapsulation efficiency |
| $\eta_{rt}$ | Threshold that defines the minimum acceptable encapsulation efficiency for real-time traffic |
| $\eta_{nrt}$ | Threshold that defines the minimum acceptable encapsulation efficiency for non-real time traffic |
| $S_{opt}$ | Optimal payload size for a section |
| $T_i(j)$ | jth cell inter-arrival time in the ith flow |
| $S_i(j)$ | Size (in bytes) of the jth cell in the ith flow |
| $\mu_{int\_er}(i, j)$ | Exponentially weighted moving average of $T_i(j)$ |
| $\mu_{size}(i, j)$ | Exponentially weighted moving average of $S_i(j)$ |
| $\tau_i(j)$ | $T_i(j) - \mu_{inter}(i, j)$ |
| $s_i(j)$ | $S_i(j) - \mu_{size}(i, j)$ |
| $ff_{inter}$ | Forgetting factor for updating $\mu_{inter}(i, j)$ |
| $ff_{size}$ | Forgetting factor for updating $\mu_{size}(i, j)$ |
| $T_i(m; r)$ | r-step forecast for the inter-arrival time of the ith flow, starting form the mth inter-arrival time |
| $S_i(m; r)$ | r-step forecast for the cell size of the ith flow, starting from the mth cell size |
| $\alpha_i(m)$ | Coefficient of the autoregressive(1) model for the cell inter-arrival time in the ith flow after the arrival of the mth cell |
| $\hat{\alpha}_i(m)$ | Estimated value of $\alpha_i(m)$ |
| $\beta_i(m)$ | Coefficient of the autoregressive(1) model for the cell size in the ith flow after the arrival of the mth cell |
| $\hat{\beta}_i(m)$ | Estimated value of $\beta_i(m)$ |
| $Q_{max}$ | Maximum number of bytes of an encapsulation section |
| $Q_{RT}$ | Number of MPEG2 packets in the real-time buffer at the current time |
| $Q_{RT}^{pred}(t)$ | Predicted number of $Q_{RT}$ after t seconds |
| $d_i$ | Worst case jitter experienced by cells of the ith flow |
| $\hat{d}_i$ | Predicted value of $d_i$ after one (future) inter-arrival time |
| $D_i$ | Jitter requirement for the ith flow |
| $R_{encap}$ | Output rate of the encapsulator in bps |
| $R_i$ | Peak input rate for the ith flow in bps |
| $S^{(i)}_{tot}$ | Number of bytes in the ith per-flow queue at a given time instant |
| $\hat{S}^{(i)}_{tot}(x)$ | Predicted value of $S^{(i)}_{tot}$ after x seconds |
| $S^{(i)}_{current}$ | Size of the most recent cell to arrive from the ith flow in seconds |
| $\hat{S}^{(i)}_{next}$ | Predicted size of the subsequent inter-arrival interval in the ith flow in seconds |
| $T^{(i)}_{current}$ | Duration of the most recent inter-arrival time in the ith flow (in seconds) |
| $\hat{T}^{(i)}_{current}$ | Predicted length of the subsequent inter-arrival interval in the ith flow (in seconds) |
| $t^{(i)}_{start}(k)$ | Arrival time of the first bit of the kth cell in the ith flow |
| $t^{(i)}_{start,1}$ | Arrival time for the first bit of the last cell of an MPE section in the ith flow |
| $t^{(i)}_{start,2}$ | Arrival time for the first bit of the first cell of an MPE section in the ith flow |
| $t^{(i)}_{finish,1}$ | Departure time for the first bit of the last cell of an MPE section in the ith flow |
| $t^{(i)}_{finish,2}$ | Departure time for the first bit of the first cell of an MPE section in the ith flow |
| $\hat{t}_{finish,2}^{(i)}$ | Predicted value of $t^{(i)}_{finish,2}$ |
| $W^{(i)}$ | $\hat{T}_{next}^{(i)} + 8\hat{S}_{next}^{(i)}/R_i$ |
| $t_{current}$ | Current time at the encapsulator |
| $m_{last}^{(j)}$ | Index of the most recent cell to arrive at the jth queue |

In the illustrated method, packets are received at the per-flow queues 40 and 30 from real-time flows 15 and non-real-time flows 20. As an example, a packet of real-time flow 15a is received by real-time per-flow queue 40a. In describing the embodiment of FIG. 4, the term "per-flow queue" refers to a real-time per-flow queue 40 or a non-real-time per-flow queue 30.

The method begins at step 400, where a per-flow queue receives a packet. The method then proceeds to step 402, where the size of an encapsulation section including the received packet is compared to a maximum number of bytes $Q_{max}$ of an encapsulation section. The size of an encapsulation section describes the combined sizes of the one or more packets stored at the per-flow queue. According to one embodiment, the maximum number of bytes $Q_{max}$ may be 4080 bytes. If the size of the encapsulation section exceeds the maximum number of bytes $Q_{max}$ associated with the per-flow queue, the method proceeds to step 416 to encapsulate the packet.

If the size of the encapsulation section does not satisfy the maximum number of bytes $Q_{max}$ associated with the per-flow queue, the method proceeds to step 404 to determine if a current encapsulation efficiency $\eta(\chi)$ of the one or more packets accumulated at the per-flow queue satisfies a first threshold. In general, step 404 determines if a current encapsulation efficiency $\eta(\chi)$ satisfies a real-time encapsulation efficiency threshold $\eta_{rt}$ or a non-real time encapsulation efficiency threshold $\eta_{nrt}$. According to one embodiment, the current encapsulation efficiency may be defined as, for example, the ratio of a number $\chi$ of payload bytes associated with an encapsulation section comprising one or more packets accumulated in the per-flow queue to the total number of bytes of the encapsulation section. According to one embodiment, the payload bytes refer to the IP-traffic bytes that generate an encapsulation section. Accordingly, the current encapsulation efficiency may be described by Equation (1):

$$\eta(\chi) = \frac{\chi}{204 \left\lceil \frac{(\chi + 24)}{184} \right\rceil}, \text{ for } 1 <= \chi <= 4080 \quad (1)$$

where $\lceil . \rceil$ is the ceiling function. Referring to Equation (1), the larger the value of the number $\chi$ of payload bytes, the higher the current encapsulation efficiency $\eta(\chi)$ However, the trend may not be monotonic due to padding of unused bytes in a cell. For example, the optimal efficiency $\eta_{opt}$, for one embodiment, is achieved when number $\chi = S_{opt} = 4024$ bytes, as described by Equation (2):

$$\eta_{opt} = \max \eta(\chi) = \eta(4024) = 89.66\% \quad (2)$$

According to one embodiment, real-time encapsulation efficiency threshold $\eta_{rt}$ and non-real time encapsulation efficiency threshold $\eta_{nrt}$ are predetermined encapsulation efficiency thresholds associated with a corresponding real-time or non-real-time per-flow queue, respectively. An encapsulation efficiency threshold may describe a minimum acceptable encapsulation efficiency. For example, the value of threshold $\eta_{rt}$ may be set approximately at 80%. To summarize step 404, a current encapsulation efficiency $\eta(\chi)$ for packets received at the per-flow queue is obtained from Equation (1). The current encapsulation efficiency $\eta(\chi)$ is compared with an encapsulation efficiency threshold to determine if the encapsulation efficiency threshold has been satisfied. If the current encapsulation efficiency does not satisfy the encapsulation efficiency threshold at step 404, the method proceeds to step 420 to wait for the next packet.

If the current encapsulation efficiency satisfies the encapsulation efficiency threshold at step 404, the method proceeds to steps 406 and 408 to predict a next encapsulation efficiency and a next packet arrival time. According to one embodiment, a next encapsulation efficiency may be associated with one or more packets including a predicted next packet accumulated at a per-flow queue. In the illustrated example, predicting the next encapsulation efficiency comprises predicting a next packet size. The next packet arrival time is calculated to predict delay.

According to one embodiment, steps 406 and 408 are calculated, for example, using a recursion procedure. According to another embodiment, predicting a next packet size and predicting a next packet arrival time may be obtained by an iterative procedure or any other procedure suitable to generate the predicted values of a next packet size and a next packet arrival time.

For example, steps 406 and 408 may be performed in the following manner. A predicted next packet size $S_i(j)$, used to calculate a next encapsulation efficiency at step 406, may be associated with the size of bytes of the jth packet of the ith flow. Similarly, a predicted next packet arrival time $T_i(j)$ is associated with the jth packet arrival time of the ith queue flow. The exponentially weighted moving averages (EMWAs) of $T_i(j)$ and $S_i(j)$ may be defined as $\mu_{inter}(i,j)$ and $\mu_{size}(i,j)$ given by Equations (3) and (4), respectively:

$$\mu_{inter}(i,j+1) = ff_{inter}\mu_{inter}(i,j)+(1-ff_{inter})T_i(j+1) \quad (3)$$

$$\mu_{size}(i,j+1) = ff_{size}\mu_{size}(i,j)+(1-ff_{size})S_i(j+1) \quad (4)$$

where $ff_{inter}$ and $ff_{size}$ are forgetting factors that determine the degree of adaptiveness in the estimation of the moving averages.

According to one embodiment, the next encapsulation efficiency calculated at step 406 and the prediction of next packet arrival time calculated at step 408, may include modeling a sequence according to an autoregressive model. In the illustrated example, an arrival time sequence may be modeled by defining $(\tau_i(j) \equiv T_i(j) - \mu_{inter}(i, j))$ and a packet size sequence may be modeled by defining $(s_i(j) \equiv S_i(j) - \mu_{size}(i,j))$, where $\tau_i(j)$ and $s_i(j)$ are normalized, zero-mean, packet inter-arrival times and sizes, respectively. Thus, according to one embodiment, for each i, the sequences $(\tau_i(j): j=1, 2, \ldots)$ and $(s_i(j): j=1,2, \ldots)$ may be obtained according to an autoregressive model of order one (AR(1)) with time-varying coefficients as described by Equations (5) and (6):

$$\tau_i(k+1) = \alpha_i(k)\tau_i(k) + \sigma_i \epsilon(k+1), k=1,2, \quad (5)$$

$$s_i(k+1) = \beta_i(k)s_i(k) + \xi_i \epsilon(k+1), k=1,2, \quad (6)$$

where $\alpha_i(k)$ and $\beta_i(k)$ are time-varying coefficients, $\{\epsilon(j): j=1,2, \ldots\}$ is a sequence of independent identically distributed zero-mean random variables of the noise processes, and $\sigma_i$ and $\xi_i$ are variance-related coefficients of the noise processes. The modeling of a sequence may be performed using any autoregressive techniques.

As discussed previously, the predicted size of the next packet $S_i(j)$ and predicted next packet arrival time $T_i(j)$ are determined at steps 406 and 408, respectively. For an ith per-flow queue flow, where $i=1, 2, \ldots, n_v$, and j packets, where $j=1, 2, \ldots, m$, and m is the index of the most recent packet to arrive at the encapsulator, the predicted values of $T_i(j)$ and $S_i(j)$ for $j>m$ during the r-step of a recursion procedure are described respectively by Equations (7) and (8):

$$\hat{T}_i(m;r) = (\hat{\alpha}_i(m))^r(T_i(m) - \mu_{inter}(i,m)) + \mu_{inter}(i,m) \quad (7)$$

$$\hat{S}_i(m;r) = (\hat{\beta}_i(m))^r(S_i(m) - \mu_{size}(i,m)) + \mu_{size}(i,m) \quad (8)$$

where the adjusted coefficients $\hat{\alpha}_i(m)$ and $\hat{\beta}_i(m)$ are obtained by minimizing the mean-square error as described by Equations (9) and (10):

$$\hat{\alpha}_i(m) = \frac{\sum_{j=1}^{m-1} T_i(j)T_i(j+1)}{\sum_{j=1}^{m-1} T_i^2(j)} \quad (9)$$

$$\hat{\beta}_i(m) = \frac{\sum_{j=1}^{m-1} S_i(j)S_i(j+1)}{\sum_{j=1}^{m-1} S_i^2(j)} \quad (10)$$

As previously described, the illustrated method may use a recursion procedure. According to one embodiment, the adjusted coefficient $\hat{\alpha}_i(m)$ may be generated recursively each time a next packet arrival time needs to be predicted. To predict a next packet arrival time called for at step 408, a value for $\hat{\alpha}_i(m)$ may be determined using recursive variables $Y_i(k)$ and $Z_i(k)$ as defined by Equations (11) and (12):

$$Y_i(k) \stackrel{def}{=} \sum_{j=1}^{k} T_i(j)T_i(j+1) = Y_i(k-1) + T_i(k)T_i(k+1) \quad (11)$$

$$Z_i(k) \stackrel{def}{=} \sum_{j=1}^{k} T_i^2(j) = Z_i(k-1) + T_i^2(k) \quad (12)$$

where the r-step prediction may be obtained using the following procedure once the mth measurement for the last arrival time is available:

For all $i=1, \ldots, n_v$, do
  (Initialization) After the arrival of the first packet, do
    $\hat{T}_i(1; r) = \mu_{inter}(i,1) = T_i(1)$
    $Y_i = 0$
    $Z_i = 0$
  (Recursion) For each subsequent cell arrival, m, do
    Update EMWA: $\mu_{inter}(i,m) = ff_{inter}\mu_{inter}(i,m-1) + (1-ff_{inter})T_i(m)$
    $Y_i = Y_i + T_i(m-1)T_i(m)$
    $Z_i = Z_i + T_i^2(m-1)$
    $\hat{\alpha}_i(m) = Y_i/Z_i$
    $\hat{T}_i(m;r) = (\hat{\alpha}_i(m))^r(T_i(m) - \mu_{inter}(i,m)) + \mu_{inter}(i,m)$
  End-recursion
End-for The prediction of the next encapsulation efficiency at step 406 may be determined using a similar recursion procedure. Once the prediction of next encapsulation efficiency is determined, the method proceeds to step 410 to determine if the predicted next encapsulation efficiency exceeds the current encapsulation efficiency previously determined at step 404 by Equation (1). If the next encapsulation efficiency is lower than the current encapsulation efficiency, the method proceeds to step 416 to encapsulate the packets accumulated at the per-flow queue.

If the next encapsulation efficiency is higher than the current encapsulation efficiency, the method proceeds to step 412 to determine the expected delay associated with receiving the next packet. In the illustrated method, the expected delay may be defined as the absolute value of the difference between the delay of the first packet at the encapsulator and the delay of the next packet. According to one embodiment, when a first packet arrives at the encapsulator, the time of arrival of the first packet is noted until the value is updated with the time of arrival of a subsequent or next packet. The time of arrival of the first bit of the kth packet in the ith flow queue may be represented by $t_{start}^{(i)}(k)$, where $k=1,2,\ldots$, and $i=1,2,\ldots,n_v$. The times of arrival and departure for the first bit of a first packet may be represented by $t^{(i)}_{start,1}$ and $t^{(i)}_{finish,1}$. Similarly, the times of arrival and departure for the first bit of a second packet may be represented by $t^{(i)}_{start,2}$ and $t^{(i)}_{finish,2}$. The expected delay $d_i$ may be defined by Equation (13):

$$d_i^{def} = \max\{0, (t^{(i)}_{finish,2} - t^{(i)}_{finish,1}) - (t^{(i)}_{start,2} - t^{(i)}_{start,1})\} \quad (13)$$

In the worst case, the computation of $d_i$ may be performed after each packet arrives at the per-flow queue.

To initialize the process of determining delay $d_i$ at step 412, $t^{(i)}_{start,1} = t^{(i)}_{finish,1} = 0$ and $t^{(i)}_{start,2} = t^{(i)}_{start,1}$. Subsequently, when an encapsulation section is formed, the value of $t^{(i)}_{start,1}$ is updated and used to update $t^{(i)}_{finish,1}$ as described by Equation (14):

$$t^{(i)}_{finish,1} = t^{(i)}_{start,1} + \frac{8S^{(i)}_{current}}{R_i} + \frac{Q_{RT} + \left\lceil \frac{S^{(i)}_{tot} - S^{(i)}_{current} + 20}{184} \right\rceil}{\frac{R_{encap}}{(204)(8)}} \quad (14)$$

where $S_{tot}^{(i)}$ is the current number of bytes in the per-flow queue, $S_{current}^{(i)}$ is the size of the most recent packet to arrive from the ith per-flow queue, $R_i$ is the peak rate in bits per second of the ith flow, $R_{encap}$ is the rate of the encapsulator in bps, and $Q_{RT}$ is the number of encapsulated cells in the real-time per-flow queue 40 at the time of computing $t^{(i)}_{finish,1}$. According to one embodiment, time $t^{(i)}_{finish,1}$ may be generated by, for example, using expression $t^{(i)}_{start,1} + (8S^{(i)}_{current}/R_i)$, if it is computed at or after the last bit of the first packet arrives. After the encapsulation section including the first packet is formed, the value of time $t^{(i)}_{start,2}$ is updated.

Determining the delay $d_i$ of Equation (13) at step 412 may require the prediction of time $t^{(i)}_{finish,2}$. The predicted value of time $t^{(i)}_{finish,2}$ may be referred to as $\hat{t}^{(i)}_{finish,2}$ and described by Equation (15):

$$\hat{t}^{(i)}_{finish,2} \approx t_{current} + W^{(i)} + \frac{Q^{pred}_{RT}(W^{(i)})(204)(8)}{R_{encap}} \quad (15)$$

where:

$$W^{(i)} \stackrel{def}{=} \hat{T}^{(i)}_{next} + \frac{8\hat{S}^{(i)}_{next}}{R_i} \quad (16)$$

and $Q^{pred}_{RT}(t)$ is the predicted number of cells at the real-time buffer 50 after t seconds from the current time $t_{current}(Q^{pred}_{RT}(0)=Q_{RT})$. The predicted packet arrival time $\hat{T}^{(i)}_{next}$ and the predicted packet size $\hat{S}^{(i)}_{next}$ of Equation (16) may be obtained from Equations (7) and (8) as previously described.

To generate predicted time $\hat{t}_{finish,2}^{(i)}$ in accordance with Equation (15), the predicted number of cells at the real-time buffer 50 $Q_{RT}^{pred}(W^{(i)})$ may be obtained from Equation (17):

$$Q^{pred}_{RT}(W^{(i)}) \approx \max\left\{0, Q_{RT} + \sum_{\substack{j=1 \\ j \neq i}}^{n_v} \left\lceil \frac{\hat{S}^{(j)}_{tot}(W^{(i)}) + 24}{184} \right\rceil - \frac{R_{encap} W^{(i)}}{(204)(8)}\right\} \quad (17)$$

where $\hat{S}_{tot}^{(j)}(W^{(i)})$ is described as the number of additional bytes that could accumulate at queue j as defined by Equations (18) through (22):

$$j = \sum_{k=1}^{r^*} \hat{S}_j(m^{(j)}_{last}; k) \quad (18)$$

where the recursion variable r* is the largest integer that satisfies Equation (19):

$$\sum_{k=1}^{r^*} \hat{T}_j(m^{(j)}_{last}; k) \leq W^{(i)} + t_{current} - t^{(j)}_{start}(m^{(j)}_{last}) \quad (19)$$

and where $m_{last}^{(j)}$ is the index of the most recent packet to arrive at the jth queue.

According to one embodiment, the recursion variable r* may be, for example, the largest integer that satisfies Equation (20):

$$\sum_{k=1}^{r(t)} \hat{T}_j(m^{(j)}_{last}; k) \leq t \quad (20)$$

for any positive real value number t. Thus, using Equation (7) to obtain predicted time $\hat{T}_j(m_{last}^{(j)};k)$ and manipulating the result into Equation (20), a recursion function r(t) may be obtained as described by Equation (21):

$$r(t) \leq \frac{t}{\mu_{int\,er}} - \frac{(T_j - \mu_{int\,er}(j))(\hat{\alpha}_j - (\hat{\alpha}_j)^{r(t)+1})}{\mu_{int\,er}(j)(1 - \hat{\alpha}_j)} \quad (21)$$

Finally, once the recursion function r(t) is generated from Equation (21), for example, by using an iterative process, recursion variable r* may be obtained by substituting time t in Equation (21) with $W^{(i)}+t_{current}-t_{start}^{(j)}(m_{last}^{(j)})$ so that a solution for $\hat{S}_{tot}^{(j)}(W^{(i)})$ may be obtained from Equation (22):

$$\hat{S}_{tot}^{(j)} = S_{tot}^{(j)} + (S_j - \mu_{size}(j))\frac{(\hat{\beta}_j - (\hat{\beta}_j)^{r^*+1})}{1-\hat{\beta}_j} + r^*\mu_{size}(j) \quad (22)$$

where $\hat{\beta}_j=\hat{\beta}_j(m_{last}^{(j)})$ and $S_j=S_j(m_{last}^{(j)})$. Thus, using Equation (22) to obtain $\hat{S}_{tot}^{(j)}(W^{(i)})$ for each j=1,2, ..., $n_v$, a value for the predicted number of cells at the real-time buffer 50 $Q_{RT}^{pred}(W^{(i)})$ may be obtained from Equation (17) and therefore a delay $d_i$ in accordance with Equation (13) may be obtained.

The method proceeds to step 414 to determine if the delay associated with waiting for a next packet is within jitter bounds. The jitter bounds may comprise a predetermined maximum jitter requirement that functions as a delay threshold for evaluating a delay. According to one embodiment, the maximum jitter requirement is, for example, in the range of 25 to 35 milliseconds such as approximately 30 milliseconds. The delay obtained in step 412 is compared with the jitter requirement. A delay is within jitter bounds when the delay is lower than the jitter requirement. If the delay is within jitter bounds, that is, the delay is lower than the jitter requirement, the method proceeds to step 420 to wait and accumulate the next packet expected at the queue. If the delay is not within jitter bounds, that is, the delay is equal to or greater than the jitter requirement, the method proceeds to encapsulation of the accumulated packets in the per-flow queue under step 416 and to subsequently form cells from the encapsulation section at step 418. Cells may be formed in any suitable manner. For example, cells may be formed according to the procedure described with reference to FIG. 2. After forming the cell, the method terminates.

To summarize, if the packets accumulated satisfy the encapsulation efficiency threshold, the predicted jitter is evaluated to determine if the accumulated packets are encapsulated. If the predicted jitter is low, more packets will be accumulated. If the predicted jitter is too high, then the accumulated packets are encapsulated. The method may include more, fewer, or different steps. The steps of the method may be performed in any suitable order. For example, the prediction of the arrival time at step 408 may be performed after the determination at step 410.

Figure 5:
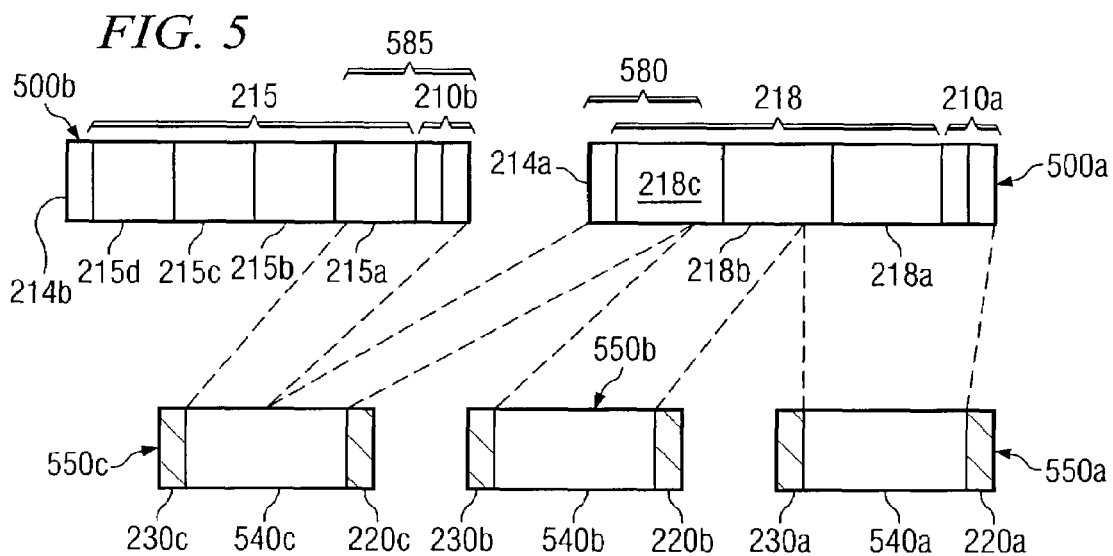
FIG. 5 illustrates another embodiment of the formation of cells from encapsulation sections.

FIG. 5 illustrates another embodiment of the formation of cells 550 from encapsulation sections 500. According to one embodiment, encapsulation section 500 may comprise a Multi-Protocol Encapsulation (MPE) section. Each encapsulation section 500 includes a section header 210, section data 215 and 218, and a section footer 214. Section header 210 may include, for example, digital video broadcasting (DVB) Multi-Protocol Encapsulation (MPE) header data. According to one embodiment, section header 210 may also include, for example, Digital Storage Media Command and Control (DSM-CC) header data. Encapsulation section 500a comprises section data 218 and encapsulation section 500b comprises section data 215, where each section data 218 and 215 comprises packets. According to one embodiment, each packet 218 and 215 may comprise an IP packet or datagram. Section footer 214 may include, for example, error correction codes. Datagram sizes may be variable, while section header 210 has, for example, 20 bytes, and section footer 214 has, for example, four bytes.

Encapsulation section 500 may be formed into cells 550. Each cell 550 includes a cell header 220, a payload 540, and a cell footer 230. Cell header 220 may include, for example, MPEG-2 packet header data. Cell footer 230 may include, for example, MPEG-2 packet footer data. Payload 540 may include MPEG-2 packets, which have, according to one embodiment, 184 bytes.

According to one embodiment, one or more encapsulation sections 500 may be formed into one or more sequential cells 550. In the illustrated example, a cell 550a may be loaded with a first portion of encapsulation section 500a, a next cell 550b may be loaded with a next portion of encapsulation section 500a, while another cell 550c may be loaded with a last portion of section 500a. In general, cells may be formed sequentially until an encapsulation section 500 has been formed into one or more cells. In the illustrated example, the last portion 580 of encapsulation section 500a may be loaded into a payload 540c of a cell 550c, and a first portion 585 of a next encapsulation section 500b is loaded into the payload 540c of cell 550c, so that a condition of having additional capacity 280 as described by FIG. 2 is substantially avoided.

Figure 6:
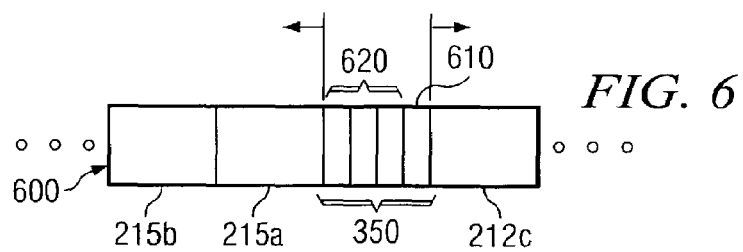
FIG. 6 illustrates another embodiment of a cell flow.

FIG. 6 illustrates another embodiment of a cell flow 600 resulting from the formation of cells 550 described with reference to FIG. 5. In general, the cell flow 600 may include packets 212 and 215 ordered sequentially, consecutively, successively, serially, or in any similar manner therewith. According to one embodiment, packets 212 and 215 may include, for example, IP packets or datagrams. In the illustrated example, the cell flow 600 may include cell footer 610 and cell header 620 that may cause a delay 350. The delay may result substantially from cell footer 610 and cell header 620 or may include any other suitable content. According to one embodiment, a cell flow 600 may be obtained to improve a delay or jitter. In the illustrated example, there may be a smaller delay 350 at a cell flow 600 described by FIG. 6 compared to the delay 350 described by FIG. 3, where an additional capacity 280 contributes to the content of the delay in the embodiment shown in FIG. 3. A cell flow 600 as described by FIG. 6 may therefore improve the delay 350 associated with receiving packets 212 and 215 when, for example, an additional capacity as described by FIG. 3 has been substantially avoided.

Certain embodiments of the invention may provide one or more technical advantages. A technical advantage of one embodiment may be that the size of an encapsulation section is adjusted in response to a current encapsulation efficiency and a predicted jitter in an effort to control jitter while maintaining efficiency. If the packets accumulated do not satisfy a predicted encapsulation efficiency threshold, the packets are encapsulated to maintain efficiency. Another technical advantage of an example may be that a delay associated with receiving predicted packets may be determined and if the delay satisfies a jitter requirement, the accumulated packets may be encapsulated to control jitter. Another technical advantage of an example may be that encapsulation sections packets may be formed into cells to improve jitter. The encapsulation sections may be formed into cells so that additional capacity in the cells is avoided.

Although an embodiment of the invention and its advantages are described in detail, a person skilled in the art could make various alterations, additions, and omissions without departing from the spirit and scope of the present invention as defined by the appended claims.

What is claimed is:

1. A method for encapsulating packets for transmission in accordance with efficiency, comprising:
receiving a plurality of packets at an encapsulator comprising a queue;
repeating the following for each packet of a subset of the plurality of packets until the subset of the plurality of packets is encapsulated:
accumulating a packet at the queue;
determining a current encapsulation efficiency associated with one or more packets accumulated at the queue;
predicting a next encapsulation efficiency associated with the one or more packets accumulated at the queue and with a predicted next packet;
encapsulating the one or more packets accumulated at the queue if the current encapsulation efficiency satisfies an encapsulation efficiency threshold and if the current encapsulation efficiency is greater than the next encapsulation efficiency; and
generating a section from the encapsulated packets.

2. The method of claim 1, wherein repeating the following for each packet of a subset of the plurality of packets until the subset of the plurality of packets is encapsulated further comprises:
determining a section size associated with the one or more packets accumulated at the queue; and
encapsulating the one or more packets accumulated at the queue if the section size satisfies a maximum section size.

3. The method of claim 1, wherein repeating the following for each packet of a subset of the plurality of packets until the subset of the plurality of packets is encapsulated further comprises:
predicting a delay associated with the packet and a next packet; and
encapsulating the one or more packets accumulated at the queue if the delay does not satisfy a jitter requirement.

4. The method of claim 1, wherein the encapsulation efficiency threshold comprises a minimum encapsulation efficiency.

5. The method of claim 1, wherein the current encapsulation efficiency comprises a ratio of a number of payload bytes associated with a predicted section comprising the one or more packets accumulated at the queue to a total number of bytes of the predicted section comprising the one or more packets.

6. The method of claim 1, wherein predicting a next encapsulation efficiency associated with the one or more packets accumulated at the queue and with a predicted next packet comprises:
predicting a next packet size; and
calculating the next encapsulation efficiency in accordance with the next packet size.

7. The method of claim 1, wherein predicting a next encapsulation efficiency associated with the one or more packets accumulated at the queue and with a predicted next packet comprises:
predicting a next packet size according to an autoregressive model; and
calculating the next encapsulation efficiency in accordance with the next packet size.

8. The method of claim 1, further comprising forming a cell comprising at least a portion of the section.

9. The method of claim 1, further comprising:
forming a first cell comprising at least a portion of the section, the first cell comprising additional payload capacity; and
forming a second cell comprising a next section.

10. The method of claim 1, further comprising forming a cell comprising a first portion of the section and a second portion of a next section.

11. The method of claim 3, wherein predicting a delay associated with the packet and a next packet comprises:
recording a first arrival time and a first departure time of the packet;
recording a second arrival time of a next packet;
predicting a second departure time of the next packet;
generating a first difference between the first departure time and the second departure time;
generating a second difference between the first arrival time and the second arrival time; and
predicting the delay in accordance with the first difference and the second difference.

12. The method of claim 3, wherein the jitter requirement comprises a maximum jitter requirement.

13. A system for encapsulating packets for transmission in accordance with efficiency, comprising:
a queue operable to receive a plurality of packets; and
a processor coupled to the queue and operable to:
repeat the following for each packet of a subset of the plurality of packets until the subset of the plurality of packets is encapsulated:
accumulating a packet at the queue;
determining a current encapsulation efficiency associated with one or more packets accumulated at the queue;
predicting a next encapsulation efficiency associated with the one or more packets accumulated at the queue and with a predicted next packet;
encapsulating the one or more packets accumulated at the queue if the current encapsulation efficiency satisfies an encapsulation efficiency threshold and if the current encapsulation efficiency is greater than the next encapsulation efficiency; and
generate a section from the encapsulated packets.

14. The system of claim 13, further comprising:
at least one buffer operable to receive a plurality of cells from the queue, the at least one buffer comprising at least one real-time buffer associated with a first priority; and
a scheduler operable to control a flow of the plurality of cells from the at least one buffer, the scheduler being operable to grant priority to the plurality of cells received from the at least one real-time buffer.

15. The system of claim 13, wherein the processor operates to:
determine a section size associated with the one or more packets accumulated at the queue; and
encapsulate the one or more packets accumulated at the queue if the section size satisfies a maximum section size.

16. The system of claim 13, wherein the processor operates to:
predict a delay associated with the packet and a next packet; and
encapsulate the one or more packets accumulated at the queue if the delay does not satisfy a jitter requirement.

17. The system of claim 13, wherein the encapsulation efficiency threshold comprises a minimum encapsulation efficiency.

18. The system of claim 13, wherein the current encapsulation efficiency comprises a ratio of a number of payload bytes associated with a predicted section comprising the one or more packets accumulated at the queue to a total number of bytes of the predicted section comprising the one or more packets.

19. The system of claim 13, wherein the processor operates to:
predict a next packet size; and
calculate the next encapsulation efficiency in accordance with the next packet size.

20. The system of claim 13, wherein the processor operates to:
predict a next packet size according to an autoregressive model; and
calculate the next encapsulation efficiency in accordance with the next packet size.

21. The system of claim 13, wherein the processor operates to form a cell comprising at least a portion of the section.

22. The system of claim 13, wherein the processor operates to:
form a first cell comprising at least a portion of the section, the first cell comprising additional payload capacity; and
form a second cell comprising a next section.

23. The system of claim 13, wherein the processor operates to form a cell comprising a first portion of the section and a second portion of a next section.

24. The system of claim 15, wherein the processor operates to:
record a first arrival time and a first departure time of the packet;
record a second arrival time of a next packet;
predict a second departure time of the next packet;
generate a first difference between the first departure time and the second departure time;
generate a second difference between the first arrival time and the second arrival time; and
predict the delay in accordance with the first difference and the second difference.

25. The system of claim 16, wherein the jitter requirement comprises a maximum jitter requirement.

26. A method for encapsulating packets for transmission in accordance with efficiency, comprising:
receiving a plurality of packets at an encapsulator comprising a queue;
repeating the following for each packet of a subset of the plurality of packets until the subset of the plurality of packets is encapsulated:
accumulating a packet at the queue;
predicting a delay associated with the packet and a predicted next packet; and
encapsulating the one or more packets accumulated at the queue if the delay does not satisfy a jitter requirement; and
generating a section from the encapsulated packets.

27. The method of claim 26, wherein predicting a delay associated with the packet and a next packet comprises:
recording a first arrival time and a first departure time of the packet;
recording a second arrival time of the next packet;
predicting a second departure time of the next packet;
generating a first difference between the first departure time and the second departure time;
generating a second difference between the first arrival time and the second arrival time; and
predicting the delay in accordance with the first difference and the second difference.

28. The method of claim 26, wherein predicting a delay associated with the packet and a next packet comprises:
predicting a next packet arrival time according to an autoregressive model; and
calculating the delay in accordance with the next packet arrival time.

29. The method of claim 26, wherein the jitter requirement comprises a maximum jitter requirement.

30. A system for encapsulating packets for transmission in accordance with efficiency, comprising:
a means for receiving a plurality of packets; and
a means for repeating the following for each packet of a subset of the plurality of packets until the subset of the plurality of packets is encapsulated:
accumulating a packet at the queue;
determining a current encapsulation efficiency associated with one or more packets accumulated at the queue;
predicting a next encapsulation efficiency associated with the one or more packets accumulated at the queue and with a predicted next packet;
encapsulating the one or more packets accumulated at the queue if the current encapsulation efficiency satisfies an encapsulation efficiency threshold and if the current encapsulation efficiency is greater than the next encapsulation efficiency; and
means for generating a section from the encapsulated packets.

31. A method for encapsulating packets for transmission in accordance with efficiency, comprising:
receiving a plurality of packets at an encapsulator comprising a queue;
repeating the following for each packet of a subset of the plurality of packets until the subset of the plurality of packets is encapsulated:
accumulating a packet at the queue;
determining a current encapsulation efficiency associated with one or more packets accumulated at the queue, the current encapsulation efficiency comprising a ratio of a number of payload bytes associated with a predicted section comprising the one or more packets accumulated at the queue to the total number of bytes of the predicted section comprising the one or more packets;
determining a section size associated with the one or more packets accumulated at the queue;
encapsulating the one or more packets accumulated at the queue if the section size satisfies a maximum section size;
predicting a next encapsulation efficiency associated with the one or more packets accumulated at the queue and with a predicted next packet;
encapsulating the one or more packets accumulated at the queue if the current encapsulation efficiency satisfies a minimum encapsulation efficiency and if the current encapsulation efficiency is greater than the next encapsulation efficiency;
predicting a delay associated with the packet and a next packet;
encapsulating the one or more packets accumulated at the queue if the delay does not satisfy a maximum jitter requirement;
generating a section from the encapsulated packets; and
forming a cell comprising at least a portion of the section.

* * * * *

UNITED STATES PATENT AND TRADEMARK OFFICE
CERTIFICATE OF CORRECTION

PATENT NO. : 7,376,141 B2 Page 1 of 1
APPLICATION NO. : 10/322120
DATED : May 20, 2008
INVENTOR(S) : Phillip I. Rosengard et al.

It is certified that error appears in the above-identified patent and that said Letters Patent is hereby corrected as shown below:

Column 10, Line 12:
Please delete "$T^{next(i)}$" and insert -- $\hat{T}^{(i)}_{next}$ --.

Signed and Sealed this

Thirtieth Day of December, 2008

JON W. DUDAS
*Director of the United States Patent and Trademark Office*